United States Patent
Matsimanis et al.

(10) Patent No.: US 10,341,531 B2
(45) Date of Patent: Jul. 2, 2019

(54) APPLYING A PERCEPTUALLY UNIFORM COLOR SPACE FOR IMAGE PROCESSING

(71) Applicant: MOTOROLA MOBILITY LLC, Chicago, IL (US)

(72) Inventors: Peter A. Matsimanis, Glenview, IL (US); Yuta Asano, Chicago, IL (US); Lin Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 22 days.

(21) Appl. No.: 15/654,972

(22) Filed: Jul. 20, 2017

(65) Prior Publication Data

US 2019/0028613 A1   Jan. 24, 2019

(51) Int. Cl.
  *G06K 9/00* (2006.01)
  *H04N 1/60* (2006.01)
  *G06T 11/40* (2006.01)
  *G06T 7/45* (2017.01)
  *G06T 7/90* (2017.01)

(52) U.S. Cl.
  CPC .......... *H04N 1/6002* (2013.01); *G06T 7/45* (2017.01); *G06T 11/40* (2013.01); *H04N 1/60* (2013.01); *H04N 1/6083* (2013.01); *G06T 7/90* (2017.01)

(58) Field of Classification Search
  CPC .. G06T 7/90; G06T 7/45; G06T 11/40; H04N 1/6002
  See application file for complete search history.

(56) References Cited

U.S. PATENT DOCUMENTS

| | | | | |
|---|---|---|---|---|
| 6,198,552 B1 * | 3/2001 | Nagae | .................. | H04N 1/6027 358/515 |
| 7,456,999 B2 * | 11/2008 | Hiramatsu | ........... | H04N 1/6033 358/1.9 |
| 2005/0018226 A1 * | 1/2005 | Chiba | .................. | H04N 1/6033 358/1.9 |

(Continued)

OTHER PUBLICATIONS

M. Sarifuddin, R. Missaoui, "A new perceptually uniform color space with associated color similarity measure for content-based image and video retrieval", Proc. ACM SIGIR Workshop Multimedia Inf. Retrieval, pp. 1-8, 2005. (Year: 2005).*

*Primary Examiner* — Bhavesh M Mehta
*Assistant Examiner* — Ian L Lemieux
(74) *Attorney, Agent, or Firm* — Yudell Isidore PLLC

(57) ABSTRACT

A method, system, and computer program product for applying a perceptually uniform color space to image color values within a captured image data. The method includes identifying, via a processor of an image capturing device, a perceptually uniform color space that includes only real colors identified within a plurality of real-world images. The method further includes applying, via the processor, the perceptually uniform color space to a color processing stage of an image processing pipeline. The method further includes in response to receiving, at the image capturing device, image data including image color values associated with a primary color space, converting, via the processor, the image color values to the perceptually uniform color space to generate image data having more perceptual uniformity for colors that are frequent in the real world.

19 Claims, 10 Drawing Sheets
(4 of 10 Drawing Sheet(s) Filed in Color)

(56) References Cited

U.S. PATENT DOCUMENTS

| | | | |
|---|---|---|---|
| 2006/0087517 A1* | 4/2006 | Mojsilovic | H04N 1/644 345/593 |
| 2008/0013827 A1* | 1/2008 | Cordes | H04N 1/6027 382/167 |
| 2009/0257648 A1* | 10/2009 | Edge | G01J 3/46 382/162 |
| 2016/0189673 A1* | 6/2016 | Naccari | G09G 5/02 345/590 |

* cited by examiner

PRIOR ART

PRIOR ART

APPLYING A PERCEPTUALLY UNIFORM COLOR SPACE FOR IMAGE PROCESSING

BACKGROUND

1. Technical Field

The present disclosure generally relates to electronic devices having camera sensors and in particular to a method for applying color spaces to captured image data.

2. Description of the Related Art

Many modern personal devices, such as cellular phones, are equipped with cameras that can be used to capture images and/or video in a field of view. These cameras capture image data in a raw format, and the data is converted to a specific type of image file associated with a color space that defines a particular range of colors that may be used to reproduce the image data. When being processed by an image processing pipeline, image data is commonly converted between multiple color spaces. For example, modern image/color processing pipelines convert color values of a captured image from a red, green, blue (RGB) color space to a luma, blue-difference, and red-difference (YCbCr) color space before providing the image data to a color processing stage. After a color processing of the image data has completed, the image data is converted back from the YCbCr color space to the RGB color space. The image data may then be displayed on a monitor, which is typically configured to display content in only a single color space (e.g., a standard RGB color space).

The conversion of image data between color spaces introduces a processing delay while the color values are converted. The conversion of image data between a color space having greater perceptual uniformity to a color space having less perceptual uniformity may also introduce color inaccuracies in the image data. A more perceptually uniform color space yields higher color accuracy and more perceptual uniformity in color values of image data at the cost of a slower conversion speed. Conversely, a less perceptually uniform color space provides less perceptually uniformity while providing a faster conversion.

BRIEF DESCRIPTION OF THE DRAWINGS

The description of the illustrative embodiments is to be read in conjunction with the accompanying drawings. The patent or application file contains at least one drawing executed in color. Copies of this patent or patent application publication with color drawing(s) will be provided by the Office upon request and payment of the necessary fee. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
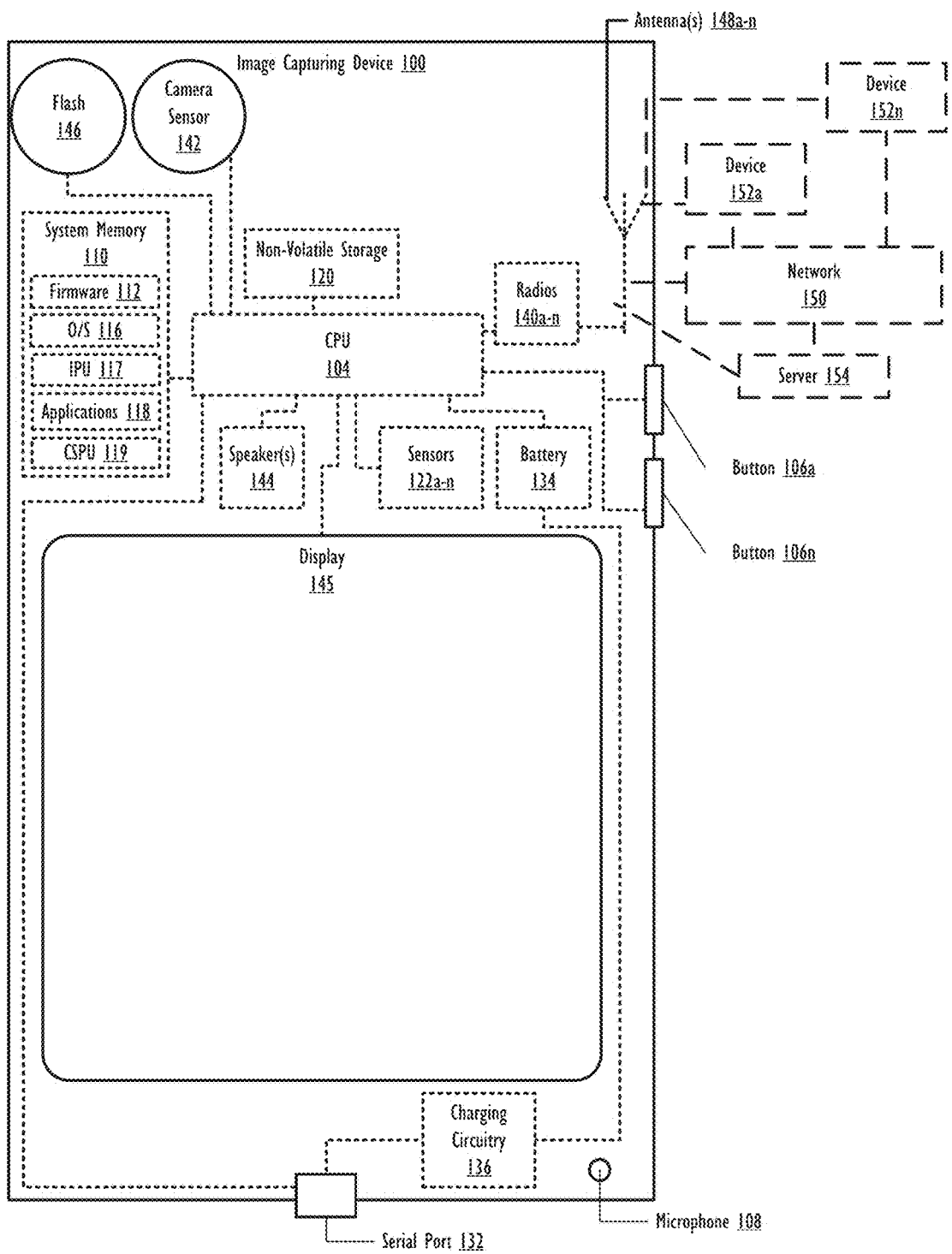
FIG. 1 illustrates an image capturing device within which certain aspects of the disclosure can be practiced, in accordance with one or more embodiments.

The illustrative embodiments provide a method, a system, and a computer program product for applying a perceptually uniform color space to image color values within a captured image data. The method includes identifying, via a processor of an image capturing device, a perceptually uniform color space that includes only real colors identified within a plurality of real-world images. The method further includes applying, via the processor, the perceptually uniform color space to a color processing stage of an image processing pipeline. The method further includes in response to receiving, at the image capturing device, image data including image color values associated with a primary color space, converting, via the processor, the image color values to the perceptually uniform color space to generate image data having more perceptual uniformity for colors that are frequent in the real world.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least one camera sensor. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU 104 is coupled to non-volatile storage 120 and system memory 110, within which firmware 112, operating system (OS) 116, image processing utility (IPU) 117, and applications 118 can be stored for execution by CPU 104. According to one aspect, IPU 117 executes within image capturing device 100 to perform the various methods and functions described herein. In one or more embodiments, IPU 117 converts image color values in a captured image data to a perceptually uniform color space to generate a representation of the image data having an increased perceptual uniformity for colors that are frequent in the real world. For simplicity, IPU 117 is illustrated and described as a stand-alone or separate software/firmware/logic component, which provides the specific functions and methods described below. However, in at least one embodiment, IPU 117 may be a component of, may be combined with, or may be incorporated within firmware 112, or OS 116, and/or within one or more of applications 118.

System memory 110 may also include a color space processing utility (CSPU) 119 for execution by CPU 104. According to one aspect, CSPU 119 executes within image capturing device 100 to generate a perceptually uniform color space from a plurality of real-world images. In an alternate embodiment, the generation of the perceptually uniform color space occurs at a data processing device separate from image processing device 100. In this alternate embodiment, data associated with the perceptually uniform color space, such as a color space transformation matrix, is downloaded to a memory and/or storage (e.g., memory 110) of image processing device 100 for use when converting image color values in a captured image data to/from the perceptually uniform color space. For simplicity, CSPU 119 is illustrated and described as a stand-alone software/firmware/logic, which provides the specific functions and methods described below. However, in at least one embodiment, CSPU 119 may be a component of, may be combined with, or may be incorporated within firmware 112, OS 116, within one or more of applications 118, and/or within IPU 117. In another embodiment, CSPU 119 is a stand-alone or separate software/firmware/logic component.

As shown, image capturing device 100 may include input devices and output devices that enable a user to interface with image capturing device 100. In the illustrated embodiment, image capturing device 100 includes camera sensor(s) 142, camera flash(es) 146, display 145, hardware buttons 106a-n, microphone(s) 108, and speaker(s) 144. While one camera sensor is illustrated, image capturing device 100 may include multiple camera sensors, in other embodiments. Hardware buttons 106a-n are selectable buttons which are used to receive manual/tactile input from a user to control specific operations of image capturing device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Microphone(s) 108 may be used to receive spoken input/commands from a user. Speaker(s) 144 is used to output audio.

CPU 104 is also coupled to sensors 122a-n and display 145. Sensors 122a-n can include, but are not limited to, at least one of: infrared (IR) sensors, thermal sensors, light sensors, motion sensors and/or accelerometers, proximity sensors, and camera/image sensors. Display 145 is capable of displaying text, media content, including images and video, and/or a graphical user interface (GUI) associated with or generated by firmware and/or one or more applications executing on image capturing device 100. The GUI can be rendered by CPU 104 for viewing on display 145, in one embodiment, or can be rendered by a graphics processing unit (GPU) (not separately shown), in another embodiment. In one embodiment, display 145 is a touch screen that is also capable of receiving touch/tactile input from a user of image capturing device 100, when the user is interfacing with a displayed GUI. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith.

Image capturing device 100 also includes serial port 132 (e.g., a universal serial bus (USB) port), battery 134, and charging circuitry 136. Serial port 132 can operate as a charging port that receives power via an external charging device (not pictured) for charging battery 134 via charging circuitry 136. Battery 134 may include a single battery or multiple batteries for providing power to components of image capturing device 100. Serial port 132 may also function as one of an input port, an output port, and a combination input/output port. In one embodiment, battery 134 may include at least one battery that is removable and/or replaceable by an end user. In another embodiment, battery 134 may include at least one battery that is permanently secured within/to image capturing device 100.

Image capturing device 100 may also include one or more wireless radios 140a-n and can include one or more antenna(s) 148a-n that enable image capturing device 100 to wirelessly connect to, and transmit and receive voice and/or data communication to/from, one or more other devices, such as devices 152a-n and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140a-n may include a short-range wireless device, including, but not limited to, a near field communication (NFC) device. In still another embodiment, image capturing device 100 may communicate with one or more other device(s) using a wired or wireless USB connection.

Figure 2:
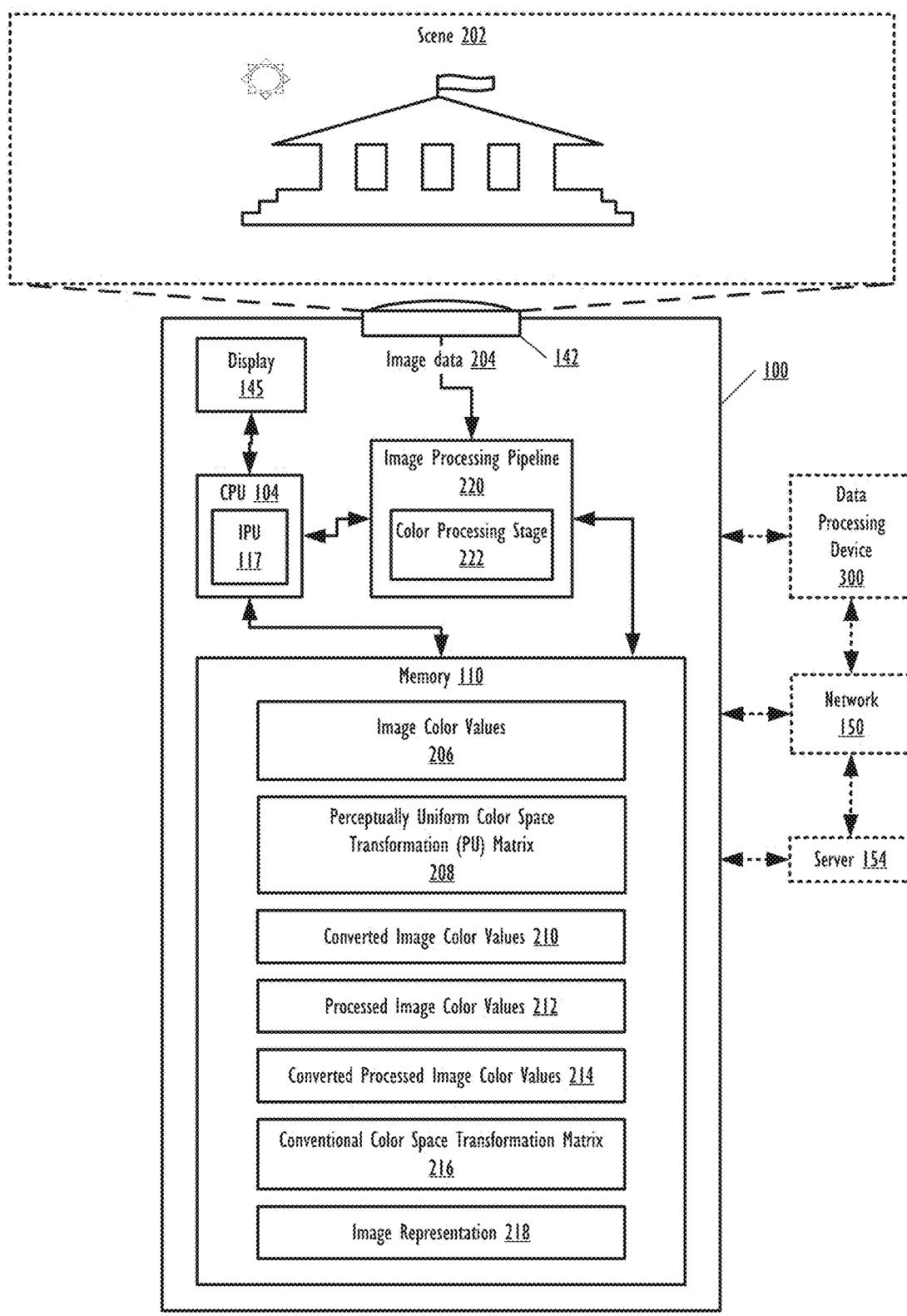
FIG. 2 illustrates an example image capturing device configured to convert image color values in an image data to a perceptually uniform color space, in accordance with one or more embodiments.

FIG. 2 is a block diagram illustrating additional functional components within example image capturing device 100, which is configured to convert image color values in an image data to a perceptually uniform color space, in accordance with one or more embodiments of the present disclosure. As illustrated, image capturing device 100 includes CPU 104, which executes IPU 117. Image capturing device 100 also includes memory 110, and camera sensor 142. In one or more embodiments, camera sensor 142 is used to capture image data 204 having image color values 206 in example scene 202. It should be noted that, in one embodiment, camera sensor 142 may include multiple camera sensors working in tandem to capture an image. It should also be noted that image data 204 may include two-dimensional or three-dimensional image data. Image capturing device 100 also includes perceptually uniform color space transformation matrix 208 (also referred to herein as PU matrix 208) for performing a matrix transformation of image color values 206 between a primary color space and a perceptually uniform color space. CPU 104 may also perform convert image color values from the perceptually uniform color space to the primary color space by performing the matrix transformation using an inverted PU matrix 208. In one or more embodiments, the primary color space is a standardized color space, such as the standard Red Green Blue (sRGB) color space, that is exclusively utilized by at least one output device (e.g., display 145) of image capturing device 100 and/or other devices (e.g., devices 152a-n) for displaying images and/or video.

The perceptually uniform color space defines a particular range of colors that may be used to create a representation of a captured image data 204. The colors provided by the particular range include only real colors identified within a plurality of real-world images (e.g., 298 real-world images). Colors not present in those real-world images are not used in the process of creating the perceptually uniform color space. Additionally, by including only real colors found in real-world images for the creation of the perceptually uniform color space, the perceptually uniform color space maintains more perceptual uniformity for images captured in the real world than other traditionally fast color spaces, such as the luma, blue-difference, and red-difference (YCbCr) color space. Similarly, the perceptually uniform color space provides a reduction in color inaccuracies in image color values 206 found in real-world images over traditionally fast color spaces.

In one or more embodiments, PU matrix 208 is created at a data processing system (e.g., data processing system 300), as described in greater detail in FIG. 3, below. In one embodiment, PU matrix 208 is a 3×3 matrix. In other embodiments, PU matrix 208 may be a matrix of another size, such as a 4×4 matrix, depending on the first and second color spaces utilized to create PU matrix 208. Image capturing device 100 may receive or retrieve PU matrix 208 from data processing system 300, or from another device or server configured to store PU matrix 208. In another embodiment, image capturing device 100 may be preconfigured to utilize the perceptually uniform color space and may contain PU matrix 208 within memory 110. In one another embodiment, IPU 117 further includes CSPU 119, which is executed by CPU 104 to generate PU matrix 208 from the plurality of real-world images provided to CSPU 119, as described in greater detail in FIG. 3, below.

Perceptually uniform color space transformation matrix 208 is created from the plurality of real-world images and is usable by CPU 104 to convert image color values 206 from a primary color space to the perceptually uniform color space (and vice versa). In one embodiment, image capturing device 100 uses PU matrix 208 to perform a matrix transformation that converts image color values 206 in the sRGB color space to the perceptually uniform color space. In other embodiments, PU matrix 208 may be used to convert image color values between the perceptually uniform color space and other color spaces, including, but not limited to: Adobe RGB, Digital Cinema Initiatives (DCI-P3), and the International Telecommunication Union Radiocommunication Sector Recommendation BT.2020 (Rec. 2020).

Image capturing device 100 captures image data 204 associated with a primary color space (e.g., RGB) via camera 142. In another embodiment, camera 142 may capture image data in a raw format that is converted/corrected to the first color space (e.g., RGB). In one embodiment, if PU matrix 208 is not present on image capturing device 100 and/or cannot be retrieved from memory 110, image capturing device 100 may retrieve PU matrix 208 from a remotely connected device, such as server 154 or data processing system 300. In one embodiment, a download of PU matrix 208 from a remotely connected server is automatically triggered during a setup and/or configuration of camera 142, OS 116, or a camera application (not illustrated) of image capturing device 100. In response to capturing image data 142, CPU 104 accesses PU matrix 208. In one or more embodiments, a conventional color space transformation matrix (conventional color space transformation matrix 216) associated with a conventional color space (e.g., YCbCr) that is utilized by image processing pipeline 220 is replaced with PU matrix 208. PU matrix 208 is then utilized by image processing pipeline 220 to convert color values prior to, and after processing by, a color processing stage (color processing stage 222).

In response to identifying PU matrix 208, CPU 104 performs a first matrix transformation using PU matrix 208 to convert image color values 206 to the perceptually uniform color space. The resulting converted image color values 210, which utilize only colors present in the perceptually uniform color space, are then provided to color processing stage 222 of image processing pipeline 220 for color processing, such as chroma enhancement, color shifts, and hue rotations.

CPU 104 receives processed image color values 212 as an output of color processing stage 222. Processed image color values 212 are image color values that are associated with the perceptually uniform color space and that were processed by the color processing stage. CPU 104 performs a second matrix transformation using PU matrix 208 to convert processed image color values 212, associated with the perceptually uniform color space, to the primary color space that is exclusively utilized by at least one output device (e.g., display 145) for displaying images and/or video. In response to the completion of the conversion, CPU 104 receives converted processed image color values 214, which utilize only colors present in the primary color space. CPU 104 then generates image representation 218, which includes image data 204 having converted processed image color values 214. Image representation 218 is provided to the at least one output device for display. In another embodiment, image representation 218 is stored to a memory (e.g., memory 110).

Figure 3:
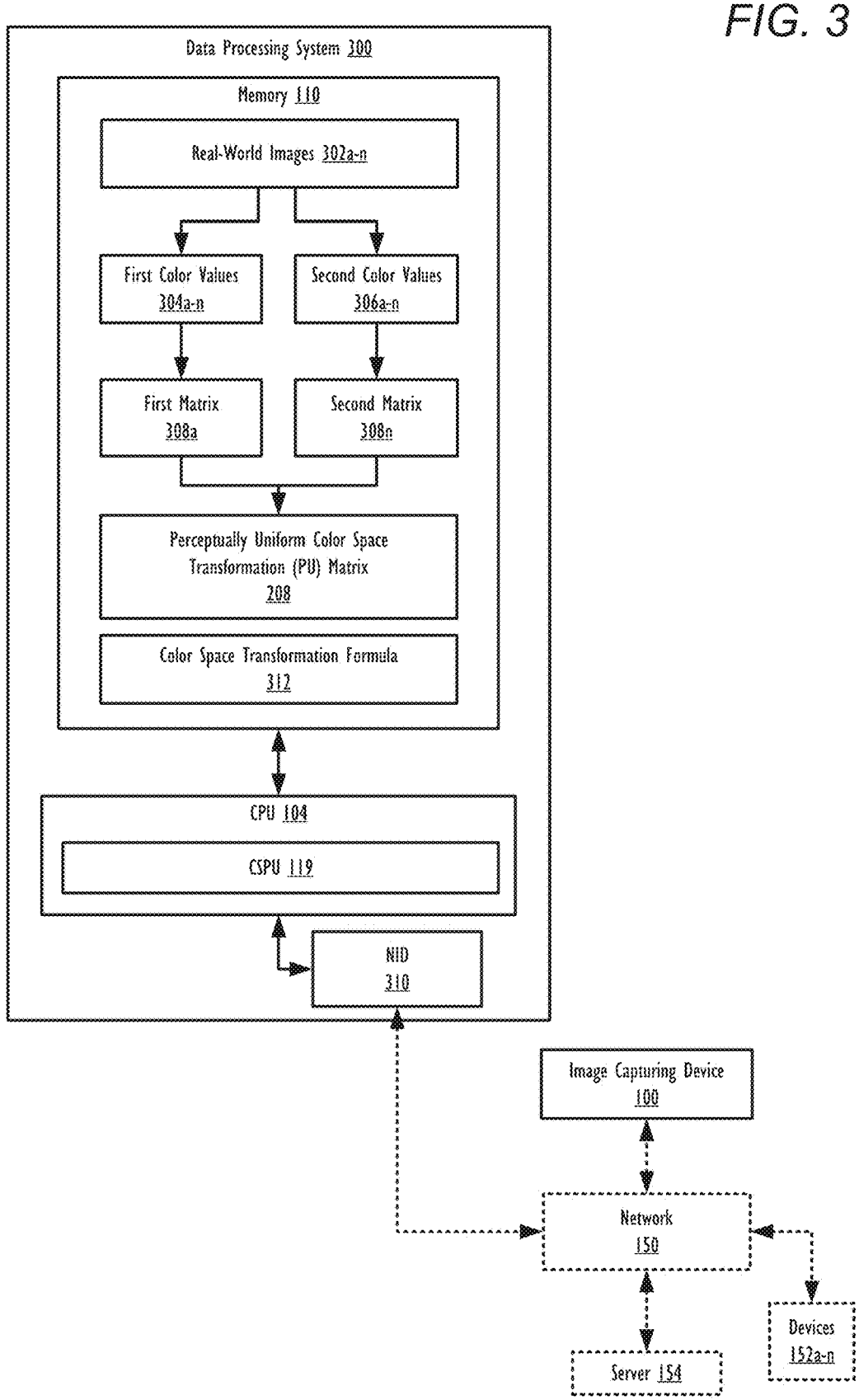
FIG. 3 illustrates an example data processing system for generating a perceptually uniform color space from a plurality of real-world images, in accordance with a first embodiment of the disclosure.

Referring now to FIG. 3, there is illustrated a data processing system 300 utilized for generating a perceptually uniform color space transformation matrix associated with a perceptually uniform color space, in accordance with one or more embodiments of the disclosure. Data processing system 300 includes memory 110, CPU 104 that executes CSPU 119, and network interface device (NID) 310. NID 310 is usable to communicatively connect data processing system 300 via one or more wired or wireless networks 150, such as the Internet, to server 154 and/or devices 152a-n. In one or more embodiments, data processing system 300 generates PU matrix 208 and provides PU matrix 208 to server 154 via network 150, where it may be downloaded by image capturing device 100. In another embodiment, the components and functionality provided by data processing system 300 may be included within image capturing device 100.

To create perceptually uniform color space, data processing system 300 first identifies real-world images 302a-n, which are a plurality of images captured from a wide variety of different real-world scenes. For example, real-world images 302a-n can include images captured in indoor scenes, outdoor scenes, images featuring a variety of objects, images of featuring people and/or faces, and images captured in a variety of lighting conditions. In one or more embodiments, the plurality of images may be manually selected by a user at data processing system 300. The number of images in real-world images 302a-n may be any number. In one embodiment, real-world images 302a-n includes 298 real-world images.

CPU 104 then determines a first color space that will be used to extract first color values 304a-n from real-world images 302a-n. In one or more embodiments, the first color space is a color space that is utilized by image capturing device 100. For example, the first color space is a color space utilized by camera 142 and/or one or more output devices (e.g., display 145) of image capturing device 100. In one or more embodiments, the first color space is the sRGB color space. In another embodiment, the first color space may be manually selected by a user.

In response to determining the first color space, CPU 104 determines a second color space that will be used to identify second color values 306a-n from real-world images 302a-n. The second color space is a color space that is different from the first color space and that is more perceptually uniform than the first color space. In one or more embodiments, the second color space is the Commission Internationale de l'Eclairage L*a*b* (CIELAB) color space. The second color space may be predetermined or may be manually selected by a user.

In response to determining the first and second color spaces, CPU 104 analyzes, each pixel within each of real-world images 302a-n, to determine, for each pixel, first color values 304a-n, which are color values associated with the first color space. For example, CPU 104 may determine an RGB value of 232 (R), 22 (G), and 46 (B) for a first pixel in a first image of real-world images 302a-n. CPU 104 would then analyze a second pixel in the first image of real-world images 302a-n, and so on and so forth until the RGB values in each pixel of each of real-world images 302a-n have been analyzed/extracted. The extracted (RGB) first color values 304a-n are arranged in a first 3×N matrix (first matrix 308a), where 'N' represents the number of images multiplied by the number of pixels per image. In one or more embodiments, first matrix 308a is arranged as shown below.

$$\begin{bmatrix} R_1 & R_2 & \ldots & R_N \\ G_1 & G_2 & \ldots & G_N \\ B_1 & B_2 & \ldots & B_N \end{bmatrix}$$

Each 'R', 'G', and 'B' in first matrix 308a, above, represents an extracted red, green, or blue intensity value within a particular range (e.g., 0 to 255) from a single pixel in one of the images of real-world images 302a-n.

In response to deriving first matrix 308a from the RGB values in each pixel of real-world images 302a-n, CPU 104 accesses a color space transformation formula 312 that may be applied to each individual color value (RGB) from in the first matrix 308a to convert that color value to a second color space. Each color value (RGB) in first matrix 308a is converted to the second color space. For example, for each set of 'R', 'G', and 'B' values in first matrix 308a, CPU 104 calculates a corresponding set of CIELAB color values. In another embodiment, CPU 104 may individually analyze each pixel in each of real-world images to determine second color values 306a-n in the second color space. The calculated (CIELAB) color values 306a-n are arranged in a second 3×N matrix (second matrix 308n), where 'N' represents the number of images multiplied by the number of pixels per image. In one or more embodiment, second matrix 308n is arranged as shown below.

$$\begin{bmatrix} L_1^* & L_2^* & L_N^* \\ a_1^* & a_2^* & a_N^* \\ b_1^* & b_2^* & b_N^* \end{bmatrix}$$

Each 'L*' in second matrix 308n, above, represents a lightness value from 0 (darkest black) to 100 (brightest white). Each 'a*' in second matrix 308n, above, represents a red-green color difference within a particular range (e.g., −100 to +100). Each 'b*' in second matrix 308n, above, represents a yellow-blue color difference within a particular range (e.g., −100 to +100). In another embodiment, the range of the green-red and yellow-blue color differences may be greater or smaller, depending on a particular level of color established by the second color space. In the example embodiment, second matrix 308n contains the L*A*B* values of each individual pixel in each of real-world images 302a-n. Using the above example, the RGB value of 232 (R), 22 (G), and 46 (B) for the first pixel in the first image is converted to a CIELAB value of 49.414 (L*), 73.197 (a*), 44.929 (b*)

In response to creating first matrix 308a and second matrix 308n, CPU 104 performs a linear regression between the first matrix 308a and second matrix 308n, as shown below.

$$M_{PU} = \begin{bmatrix} L_1^* & L_2^* & L_N^* \\ a_1^* & a_2^* & a_N^* \\ b_1^* & b_2^* & b_N^* \end{bmatrix} \begin{bmatrix} R_1 & R_2 & R_N \\ G_1 & G_2 & G_N \\ B_1 & B_2 & B_N \end{bmatrix}^{-1}$$

In response to performing the linear regression between the first matrix 308a and second matrix 308n, CPU 104 generates a 3×3 matrix (PU matrix 208) that transforms color values linearly from the first color space (sRGB) to the perceptually uniform color space, as shown in the example below.

$$M_{PU} = \begin{bmatrix} 0.2762 & 0.6682 & 0.1159 \\ -0.1403 & -0.2947 & 0.4296 \\ 0.2986 & 0.4858 & 0.1994 \end{bmatrix}$$

Data processing system 300 may then provide PU matrix 208 to at image capturing device 100 and/or another device or server (e.g., devices 152a-n and/or server 154) that is accessible by image capturing device 100. It should be noted that the values in PU matrix 208, above, are provided as an example. In other embodiments, the values in PU matrix 208 may include different values, based on the color values extracted/calculated from real-world images 302a-n that form first matrix 308a and second matrix 308n.

While the example embodiments above describe the first color space as sRGB and the second color space as CIELAB, in other embodiments, the first color space may be another color space, including, but not limited to, one of: Adobe RGB, DCI-P3, or the Rec. 2020. Additionally, the second color space may be any other color space that is different from the first color space including, but not limited to, one of: Commission Internationale de l'Eclairage L*u*v* (CIE-LUV), CIE Yuv, or Commission Internationale de l'Eclairage Color Appearance Model (CIECAM02). For example, if camera 142 and/or display 145 of image capturing device 100 uses the Adobe RGB color space, CPU may select Adobe RGB as the first color space and CIELAB as the second color space. In one or more embodiments, in addition to generating PU matrix 208 based on the first color space in image capturing device 100 and the predetermined second color space, data processing system 300 may also generate at least one different PU matrix (not illustrated) based on a first color space utilized by each at least one other image capturing device (not illustrated) and the predetermined second color space.

Figure 4:
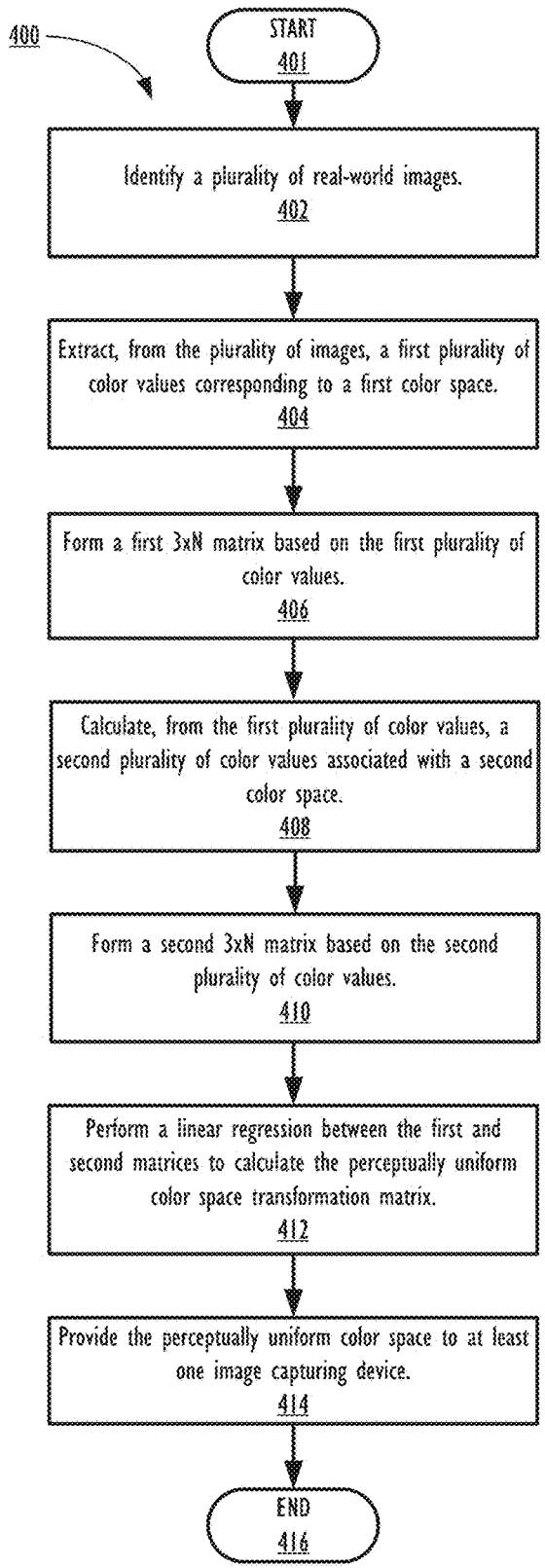
FIG. 4 is a flow chart illustrating a method for generating a perceptually uniform color space from a plurality of real-world images, in accordance with one or more embodiments.

Referring now to FIG. 4, there is depicted a high-level flow-chart illustrating a method for generating a perceptually uniform color space from a plurality of real-world images, in accordance with one or more embodiments of the present disclosure. Aspects of the method are described with reference to the components of FIGS. 1 and 3. Several of the processes of the method provided in FIG. 4 can be implemented by a processor (e.g., CPU 104) executing software code of CSPU 119 within a data processing system (e.g., data processing system 300). In another embodiment, the processes of the method provided in FIG. 4 can be implemented by a processor (e.g., CPU 104) executing software code of CSPU 119 within an image capturing device (e.g., image capturing device 100). The method processes described in FIG. 4 are generally described as being performed by components of data processing system 300.

Method 400 commences at initiator block 401 then proceeds to block 402. At block 402, CPU 104 receives an input of a plurality of real-world images (real-world images 302a-n). At block 404, CPU 104 analyzes/extracts, from each pixel in each image of real-world images 302a-n, a first plurality of color values (primary color values 304a-n) associated with a first color space (e.g., sRGB color space) that is utilized by a camera and/or one or more output devices of image capturing device 100. At block 406, CPU 104 aligns primary color values 304a-n associated with each pixel in each image of real-world images 302a-n into a first 3×N matrix. At block 408, CPU 104 converts, via color space transformation formula 312, each of primary color values 304a-n into a second plurality of color values (secondary color values 306a-n) that are associated with a second color space (e.g., CIELAB color space). At block 410, CPU 104 aligns the calculated secondary color values 306a-n associated with each pixel in each image of real-world images 302a-n into a second 3×N matrix (secondary matrix 308n). At block 412, CPU 104 performs a linear regression between primary matrix 308a and secondary matrix 308n to calculate/estimate a 3×3 matrix (PU matrix 208) that transforms color values linearly from a first color space (e.g., sRGB color space) to a perceptually uniform color space that includes only real colors identified within real-world images 302a-n. Optionally, at block 414, data processing system may provide PU matrix 208 to at least one image capturing device (e.g., image capturing device 100) or another device or server (e.g., devices 142a-n and/or server 154). Method 400 then terminates at block 416.

Figure 5:
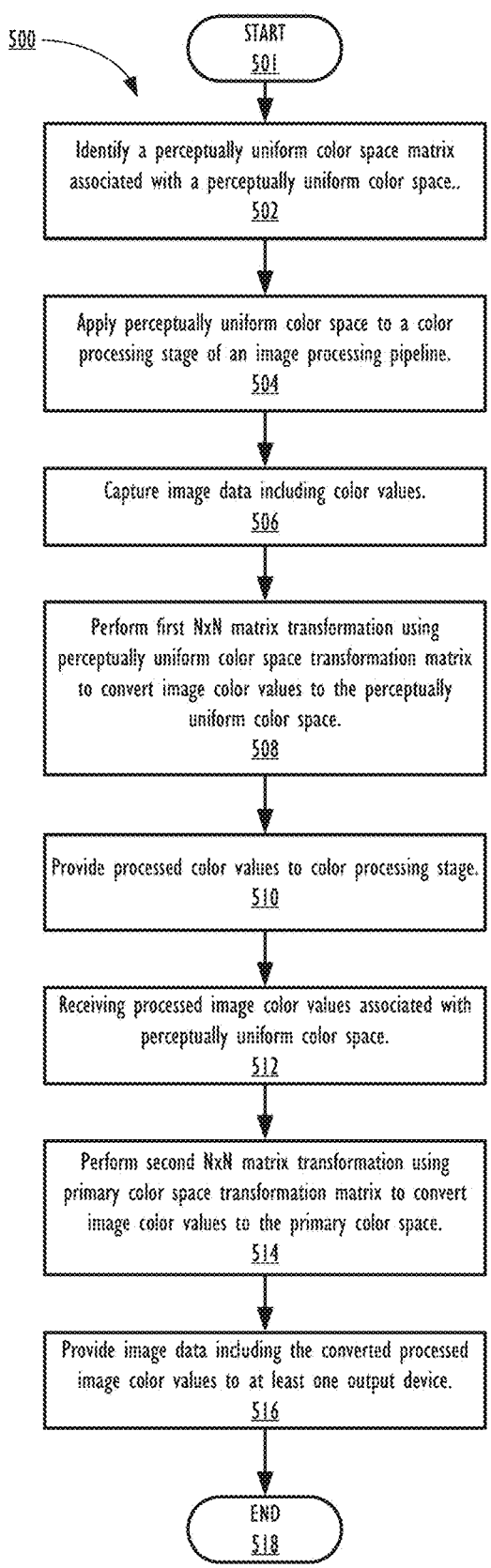
FIG. 5 is a flow chart illustrating a method for applying, at an image capturing device, a perceptually uniform color space to image color values, in accordance with one or more embodiments.

Referring now to FIG. 5, there is depicted a high-level flow-chart illustrating a method for applying a perceptually uniform color space to image color values at an image capturing device, in accordance with one or more embodiments of the present disclosure. Aspects of the method are described with reference to the components of FIGS. 1-2. Several of the processes of the method provided in FIG. 5 can be implemented by a processor (e.g., CPU 104) executing software code of IPU 117 within an image capturing device (e.g., image capturing device 100). The method processes described in FIG. 5 are generally described as being performed by components of image capturing device 100.

Method 500 commences at initiator block 501 then proceeds to block 502. At block 502, CPU 104 accesses a perceptually uniform color space transformation matrix (PU matrix 208) associated with a perceptually uniform color space. At block 504, CPU 104 applies the perceptually uniform color space to color processing stage 222 of image processing pipeline 220 of image capturing device 100. For example, in one or more embodiments, CPU 104 replaces one or more preexisting conventional color space transformation matrices (e.g., conventional color space transformation matrix 216) with PU matrix 208. At block 506, a camera (camera 142) of image capturing device 100 captures image data 204, which includes image color values 206 that are associated with a primary color space. At block 508, CPU 104 performs a first N×N matrix transformation using PU matrix 208 to convert image color values 206 to a first new set of image color values (converted image color values 210) that are associated with the perceptually uniform color space. CPU 104 may then provide converted image color values 210 to color processing stage 222 of image processing pipeline 220 (block 510).

At block 512, CPU 104 receives an output of the color processing stage that includes color values (processed image color values 212) that are associated with the perceptually uniform color space and which were processed by the color processing stage. At block 514, using PU matrix 208, CPU 104 performs a second N×N matrix transformation to processed image color values 212 associated with the perceptually uniform color space. Processed image color values 212 are transformed into a second new set of image color values (converted processed image color values 214) that are associated with the primary color space. At block 516, image data 204, including converted processed image color values 214, is provided to at least one output device (e.g., display 145). Method 500 then terminates at block 518.

Figure 6:
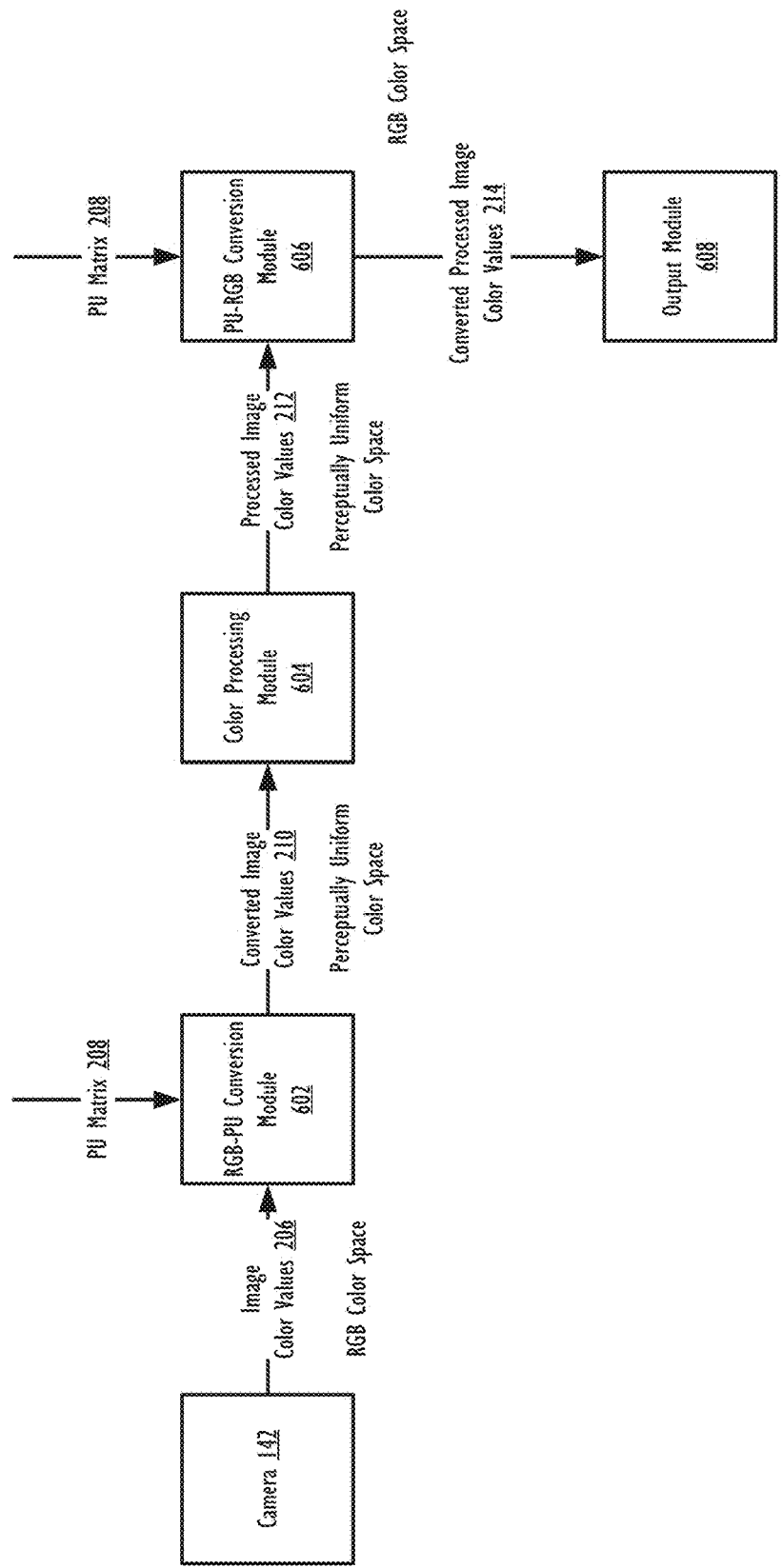
FIG. 6 is a schematic diagram illustrating one embodiment for processing image color values through an image processing pipeline that utilizes a perceptually uniform color space, according to the present disclosure.
Figure 7B:
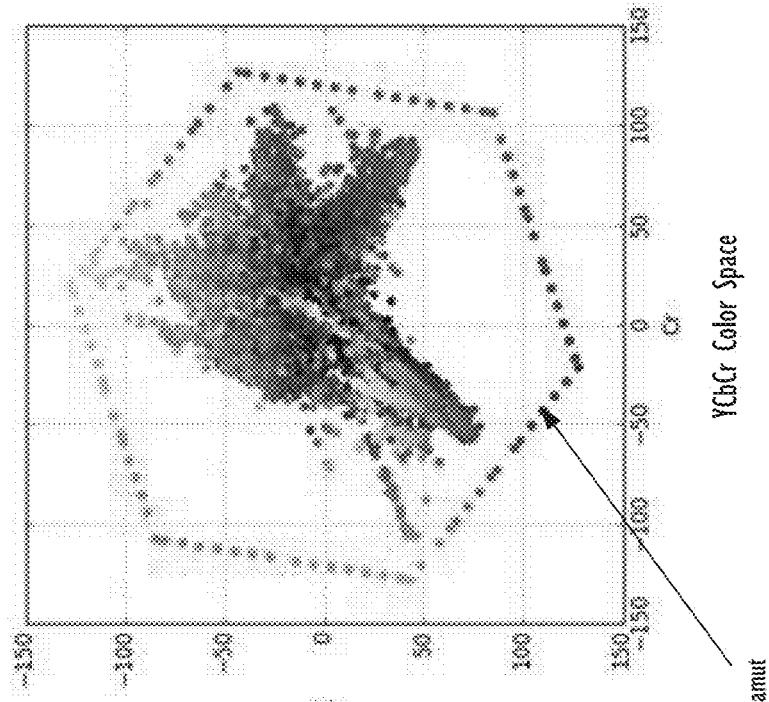
FIG. 7B is a chart that illustrates the perceptual uniformity of the colors present in real-world images 302*a*-*n* within the YCbCr color space, in accordance with the prior art.
Figure 7A:
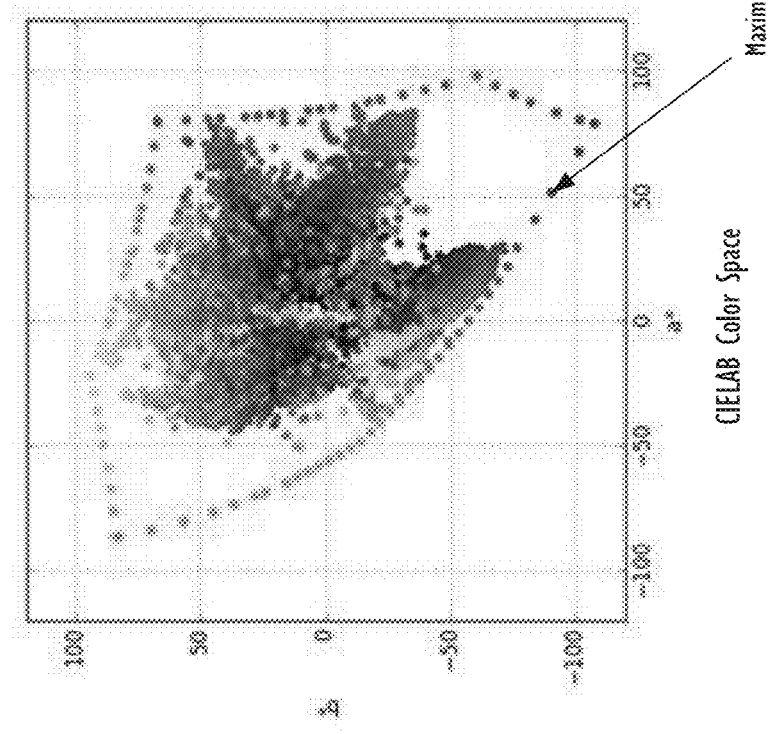
FIG. 7A is a chart that illustrates the perceptual uniformity of the colors present in real-world images 302*a*-*n* within the Commission Internationale de l'Eclairage L*a*b* (CIELAB) color space, in accordance with the prior art.

FIG. 6 is a schematic diagram illustrating one embodiment for processing image color values through an image processing pipeline that utilizes a perceptually uniform color space, according to the present disclosure. The example image capturing device 100 in FIG. 6 utilizes the sRGB device to display image data on at least one output device. Image capturing device 100 includes camera 142, sRGB-PU conversion module 602, color processing module 604, PU-sRGB conversion module 606, and output module 608. Each of modules 602-608 may comprise at least one hardware processor configured to perform a function related to processing image color values of captured image data through an image processing pipeline.

sRGB-PU conversion module 602 receives image color values 206 associated with the sRGB color space from camera 142. sRGB-PU conversion module 602 accesses PU matrix 208 and performs a matrix transformation (using PU matrix 208) to convert image color values 206 into the perceptually uniform color space. Converted image color values 210 are provided, as an output, to color processing module 604. Color processing module 604 performs at least one color processing on converted image color values 210. In response to completing the at least one color processing, color processing module 604 provides, as an output, processed image color values 212 (which are still associated with the perceptually uniform color space) to PU-sRGB conversion module 606. PU-sRGB conversion module 606 accesses PU matrix 208 and performs a matrix transformation (using PU matrix 208) to convert processed image color values 212 into the sRGB color space. Converted processed image color values 214 are provided, as an output, to output module 608. Output module may then output image data 204 including converted processed image color values 214 to at least one output device (not illustrated).

It should be noted that in another embodiment, image capturing device 100 may be configured to utilize a different color space (e.g., Adobe RGB) to display image data. In that embodiment, module 602 converts image color values 206 from Adobe RGB to the perceptually uniform color space and module 606 converts processed image color values from the perceptually uniform color space to Adobe RGB.

Figure 8:
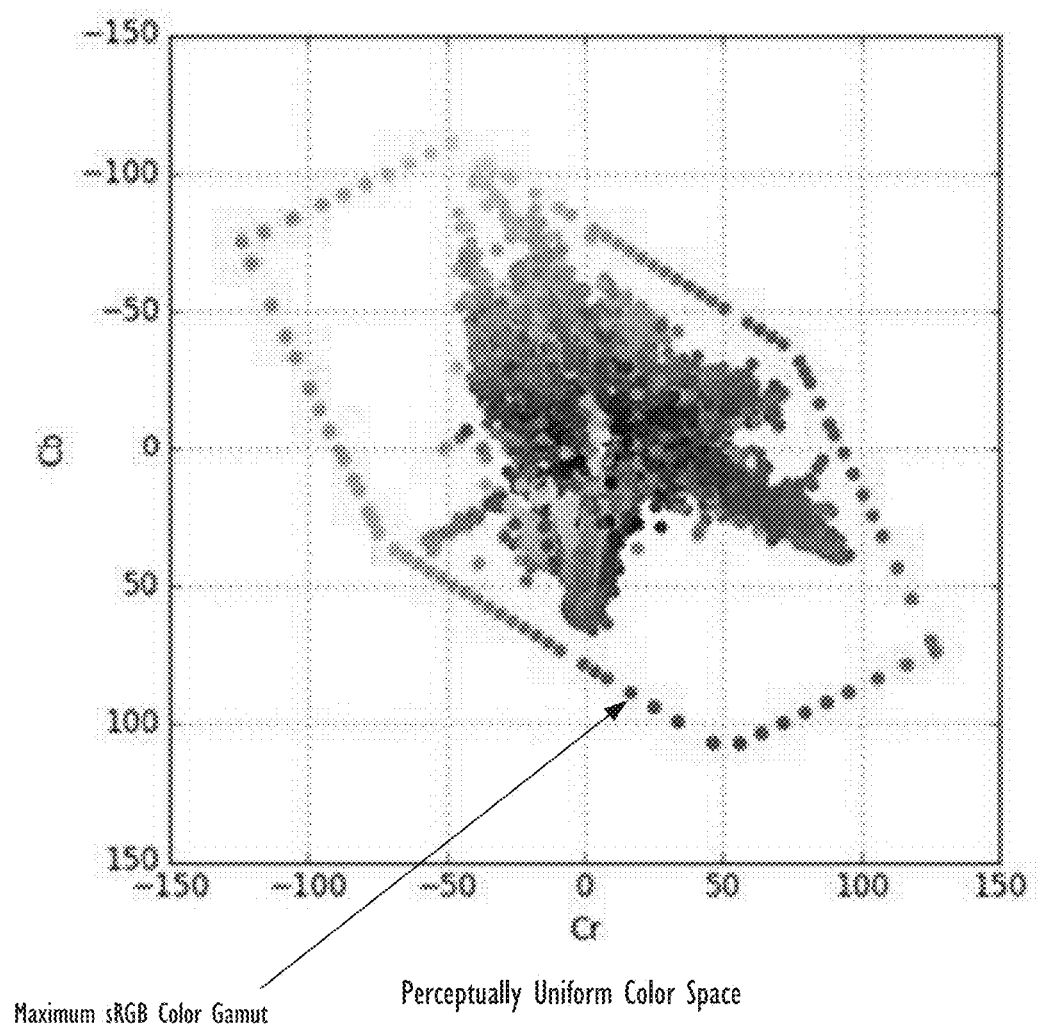
FIG. 8 is a chart that illustrates the perceptual uniformity of the colors present in a plurality of real-world images within a perceptually uniform color space, in accordance with one embodiment of the disclosure.

Referring now to FIGS. 7-10, there is depicted charts that illustrate the uniformity of color spaces in the prior art and the perceptually uniform color space that is generated from the real-world images 302a-n. FIG. 7A is a chart that illustrates the perceptual uniformity of the colors present in real-world images 302a-n within the CIELAB color space, in accordance with the prior art. FIG. 7B is a chart that illustrates the perceptual uniformity of the colors present in real-world images 302a-n within the YCbCr color space, in accordance with the prior art. FIG. 8 is a chart that illustrates the perceptual uniformity of the colors present in real-world images 302a-n within the generated perceptually uniform color space, in accordance with one embodiment of the disclosure. As illustrated, the perceptually uniform color space provides a greater perceptual uniformity than the YCbCr color space while also providing a faster conversion than the slower CIELAB color space.

Figure 9B:
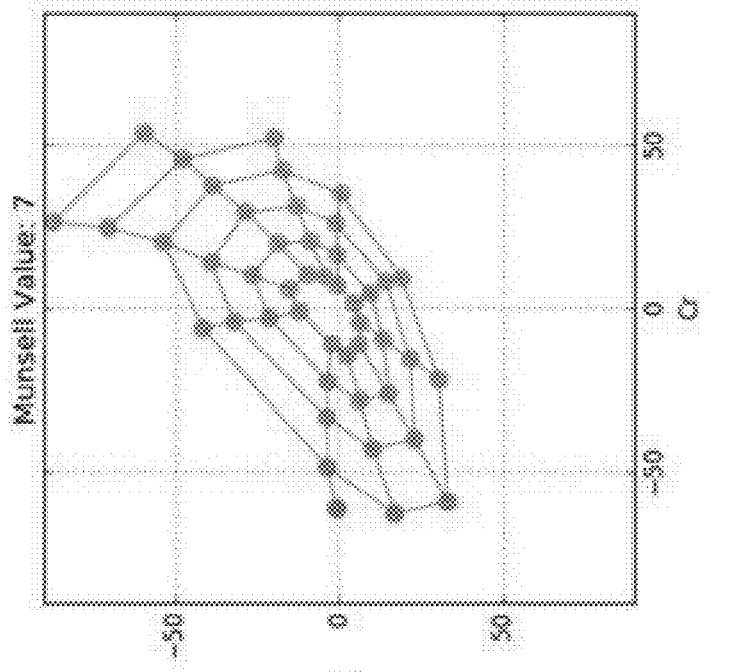
FIG. 9B is a chart that illustrates a plotting of colors of the Munsell color space within the YCbCr color space, in accordance with the prior art.
Figure 9A:
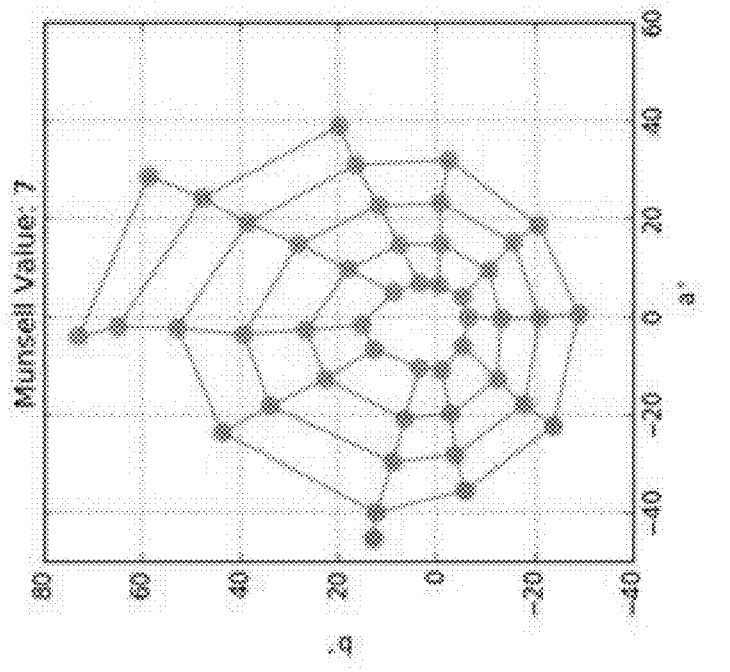
FIG. 9A is a chart that illustrates a plotting of colors of the Munsell color space within the CIELAB color space, in accordance with the prior art.
Figure 10:
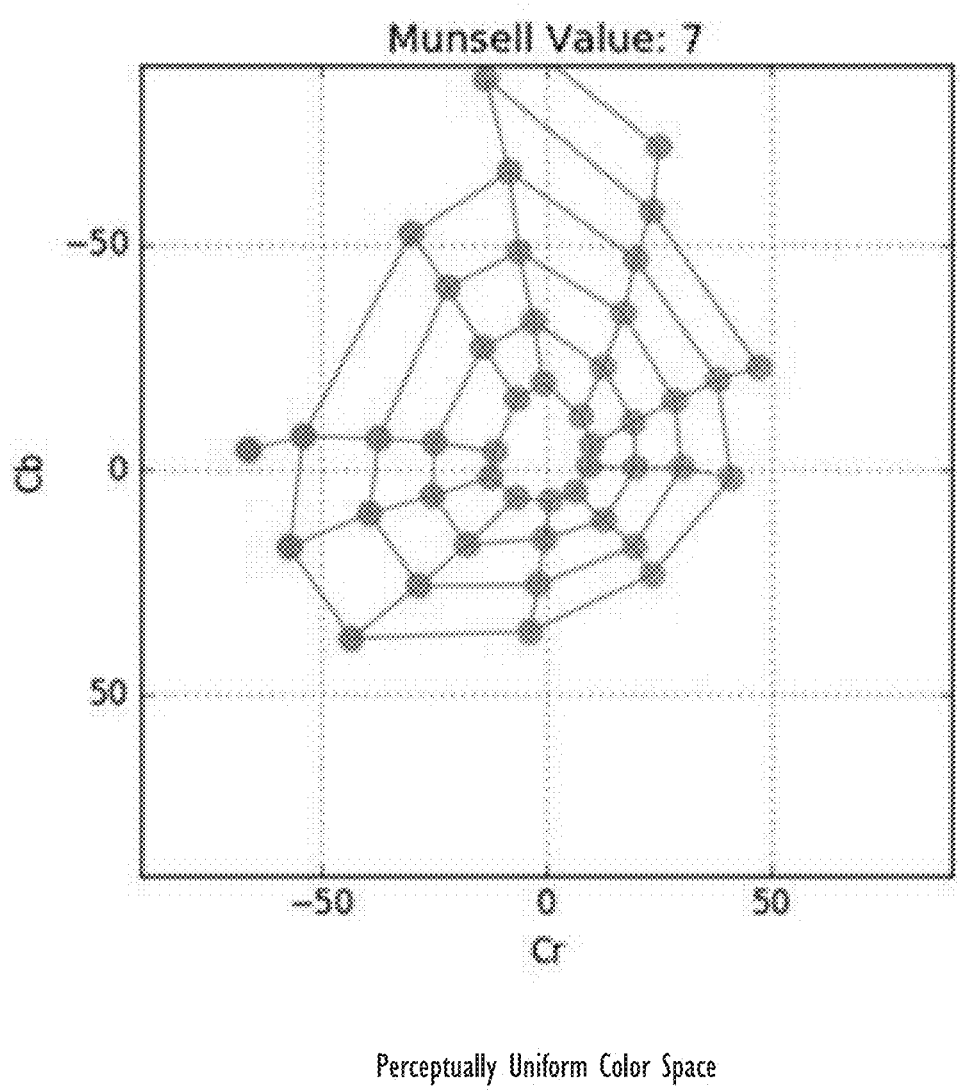
FIG. 10 is a chart that illustrates a plotting of colors of the Munsell color space within the perceptually uniform color space, in accordance with one embodiment of the disclosure.

FIG. 9A is a chart that illustrates a plot of colors of the Munsell color space within the CIELAB color space, in accordance with the prior art. FIG. 9B is a chart that illustrates a plot of colors of the Munsell color space within the YCbCr color space, in accordance with the prior art. FIG. 10 is a chart that illustrates a plot of colors of the Munsell color space within the perceptually uniform color space, in accordance with one embodiment of the disclosure. As illustrated, the perceptually uniform color space provides a greater perceptual uniformity than the YCbCr color space while also providing a faster conversion than the slower CIELAB color space.

In the above-described flow charts of FIGS. 5 and 6, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   identifying, via a processor of an image capturing device, a perceptually uniform color space that includes only real colors identified within a plurality of real-world images;
   applying, via the processor, the perceptually uniform color space to a color processing stage of an image processing pipeline; and
   in response to receiving image data captured by the image capturing device, the image data including image color values associated with a primary color space, converting, via the processor, the image color values to the perceptually uniform color space to generate a representation of the image data having more perceptual uniformity for real-world colors.

2. The method of claim 1, wherein converting the image color values to the perceptually uniform color space further comprises:
   performing, to the image color values, a first N×N matrix transformation that converts image color values from the primary color space to the perceptually uniform color space.

3. The method of claim 1, further comprising:
providing the converted image color values to the color processing stage that performs a post-color processing on the converted image color values; and
receiving, as an output of the color processing stage, processed image color values having colors associated with the perceptually uniform color space.

4. The method of claim 3, further comprising:
converting the processed image color values to the primary color space; and
providing the image data with the converted processed image color values to at least one output device that displays images using the image data with the converted processed image color values.

5. The method of claim 4, wherein converting the processed image color values further comprises:
performing, to the processed image color values, a second N×N matrix transformation that converts image color values from the perceptually uniform color space to the primary color space.

6. The method of claim 1, further comprising:
performing color space conversion between the primary color space and the conventional color space; and
replacing a conventional color space utilized by the color processing stage with the perceptually uniform color space for future post-color processing of image color values.

7. The method of claim 1, further comprising:
receiving the perceptually uniform color space from a processing device that creates the perceptually uniform color space by:
extracting, from the plurality of real-world images, red, green, and blue (RGB) color values;
forming a first 3×N matrix based on the extracted RGB color values;
calculating Commission Internationale de l'Eclairage L*a*b* (CIELAB) color values from the RGB values;
forming a second 3×N matrix based on the CIELAB color values; and
performing a linear regression between the first matrix and the second matrix to determine a 3×3 matrix that linearly transforms RGB values to the perceptually uniform color space, different from the RGB color space and the CIELAB color space.

8. An image processing device comprising:
at least one camera sensor that receives image data including image color values associated with a primary color space; and
at least one processor that:
identifies a perceptually uniform color space that includes only real colors identified within a plurality of real-world images;
applies the perceptually uniform color space to a color processing stage of an image processing pipeline of the image processing device; and
converts the image color values to the perceptually uniform color space to generate a representation of the image data having more perceptual uniformity for real-world colors.

9. The image capturing device of claim 8, wherein in converting the image color values to the perceptually uniform color space, at least one processor:
performs a first N×N matrix transformation that converts image color values from the primary color space to the perceptually uniform color space.

10. The image capturing device of claim 8, wherein the processor:
provides the converted image color values to the color processing stage that performs a post-color processing on the converted image color values; and
receives, as an output of the color processing stage, processed image color values having colors associated with the perceptually uniform color space.

11. The image capturing device of claim 10, wherein the processor:
converts the processed image color values to the primary color space; and
provides the image data with the converted processed image color values to at least one output device that displays images using the image data with the converted processed image color values.

12. The image capturing device of claim 11, wherein in converting the processed image color values, the at least one processor:
performs, to the processed image color values, a second N×N matrix transformation that converts image color values from the perceptually uniform color space to the primary color space.

13. The image capturing device of claim 8, wherein the at least one processor:
replaces a conventional color space utilized by the color processing stage with the perceptually uniform color space.

14. The image capturing device of claim 8, further comprising:
at least one input device that receives the perceptually uniform color space from a processing device that:
extracts, from the plurality of real-world images, red, green, and blue (RGB) color values;
forms a first 3×N matrix based on the extracted RGB color values;
calculates Commission Internationale de l'Eclairage L*a*b* (CIELAB) color values from the RGB values;
forms a second 3×N matrix based on the CIELAB color values; and
performs a linear regression between the first matrix and the second matrix to determine a 3×3 matrix that linearly transforms RGB values to the perceptually uniform color space.

15. A computer program product comprising:
a computer readable storage device; and
program code on the computer readable storage device that, when executed by a processor associated with an image capturing device, enables the image capturing device to provide the functionality of:
identifying, via the processor, a perceptually uniform color space that includes only real colors identified within a plurality of real-world images;
applying, via the processor, the perceptually uniform color space to a color processing stage of an image processing pipeline; and
in response to receiving image data captured by the image capturing device, the image data including image color values associated with a primary color space, converting, via the processor, the image color values to the perceptually uniform color space to generate a representation of the image data having more perceptual uniformity for real-world colors.

16. The computer program product of claim 15, the program code further comprising code for:

providing the converted image color values to the color processing stage that performs a post-color processing on the converted image color values;

receiving, as an output of the color processing stage, processed image color values having colors associated with the perceptually uniform color space;

converting the processed image color values to the primary color space; and providing the image data with the converted processed image color values to at least one output device that displays images using the image data with the converted processed image color values.

17. The computer program product of claim 15, the program code further comprising code for:

replacing a conventional color space utilized by the color processing stage with the perceptually uniform color space for future post-color processing of image color values.

18. A method comprising:

identifying, at a processing device, a plurality of real-world images;

extracting, from the plurality of real-world images, a first plurality of color values corresponding to a first color space;

forming a first 3×N matrix based on the first plurality of color values;

calculating, based on the first plurality of color values, a second plurality of color values associated with a second color space, different from the first color space;

forming a second 3×N matrix based on the second plurality of color values;

performing a linear regression between the first matrix and the second matrix to determine a 3×3 matrix that linearly transforms color values in image data to a perceptually uniform color space, different from the first color space and the second color space; and providing the perceptually uniform color space to at least one image capturing device to replace, for future post-color processing, a conventional color space utilized by an image processing pipeline of the at least one image capturing device.

19. The method of claim 18, wherein the first color space is a red, green, blue (RGB) color space, and wherein the second color space is a Commission Internationale de l'Eclairage L*a*b* (CIELAB) color space.

* * * * *